Dec. 7, 1926.
J. R. MARCHESSEAULT
1,609,524
COFFEE PERCOLATOR
Filed March 17, 1926    2 Sheets-Sheet 2
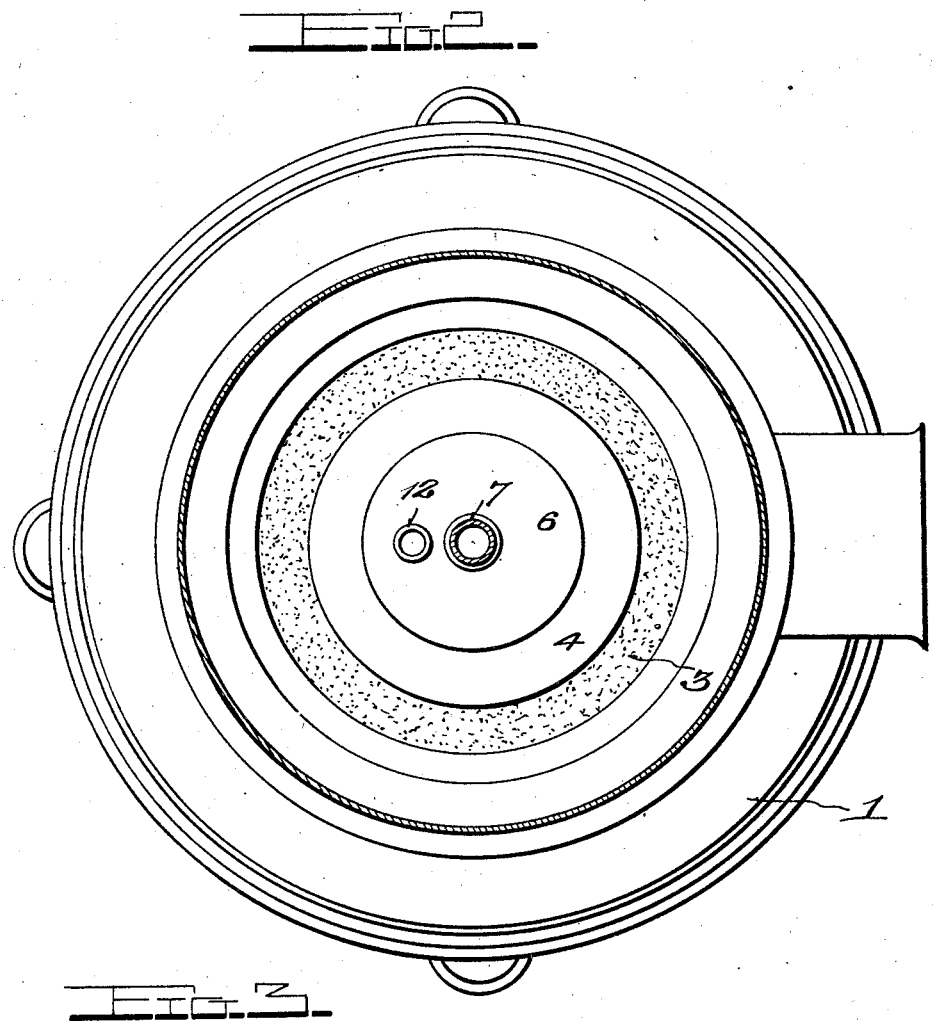
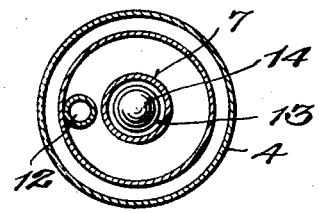
Inventor
Joseph R. Marchesseault
By Joseph A. Miller
Attorney Patented Dec. 7, 1926.

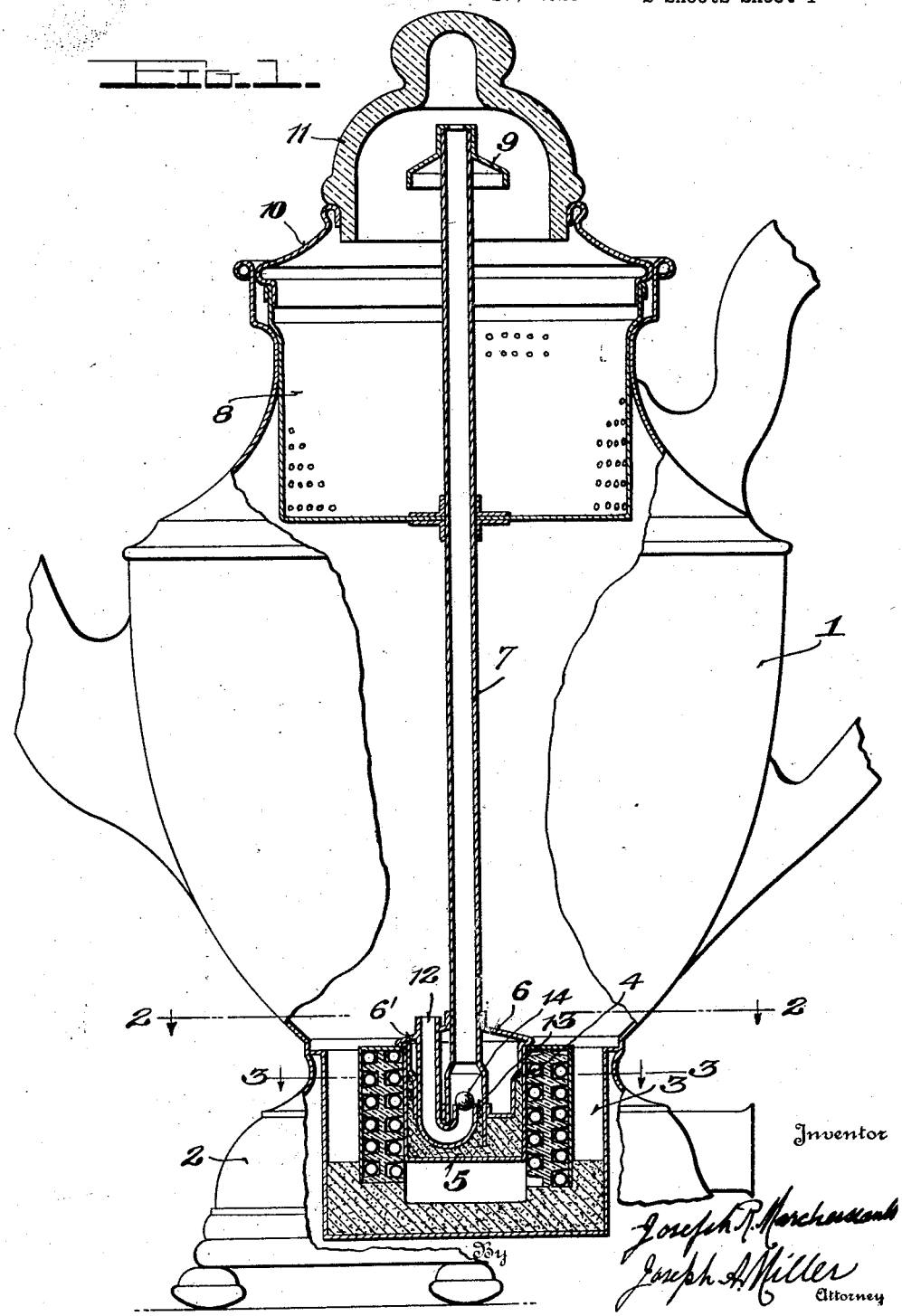

1,609,524

UNITED STATES PATENT OFFICE.

JOSEPH ROI MARCHESSEAULT, OF AUBURN, RHODE ISLAND, ASSIGNOR TO GORHAM MFG. CO., OF PROVIDENCE, RHODE ISLAND.

COFFEE PERCOLATOR.

Application filed March 17, 1926. Serial No. 95,369.

This invention relates to certain new and useful improvements in coffee percolators and relates more particularly to a structure for effecting a pumping action on the liquid so as to cause a continuous movement of circulation of the liquid from the bottom of the pot or fount up into the coffee carrier or biggin.

A further object of the invention is to provide a structure of this type wherein a novel form of electrical heating means is employed for effecting heating and also the forced or pump-like circulation of the liquid.

A still further object of the invention is to provide a form of liquid circulation means which can be easily and quickly removed from the pot or fount.

The invention has still further and other objects which will be later set forth and manifested in the course of the following description.

In the drawings:—

Fig. 1 is a vertical sectional view of the invention partly broken away;

Fig. 2 is a section on line 2—2 of Fig. 1 and

Fig. 3 is a section on line 3—3 of Fig. 1.

In proceeding in accordance with the present invention a pot or fount or other main container 1 is employed having a base or foot portion 2 as customary. The base is formed with a heating chamber 3 on the interior of which is located the electric heating element or unit 4 which unit may be composed of coils of wire, as shown. The heating means has an open center in which is removably fitted a cup 5 having a top 6 flanged at 6' and seated on the upper end of the heating element.

A main tube 7 extends vertically in the fount and has its lower end extending through the top of cup 6 to which latter the tube is soldered or otherwise rigidly secured. The coffee container or biggin 8 is rigidly secured to the upper part of the tube 7 and has its upper end open to discharge the liquid onto a deflector 9 attached to the upper extremity of the tube. The container 8 has a cover 10 the latter having an opening in its top closed by a removable combined cover and spreader 11, for the liquid, the part 11 being preferably made of glass.

A siphon or J-shaped tube 12 has the free upper end of its longer leg secured to the top 6 of cup 5 and its shorter leg 13 extending into the lower end of the main tube 7. The free upper end of the leg 13 forms a valve seat for a gravity ball valve 14 which latter has free upward movement in the main tube 7. The lower end of the main tube may be slightly enlarged to increase its diameter, and extends through the bottom of the cup 5, the bend or curve of the J-shaped tube 12 likewise extending through the bottom of cup 5 to thus expose these parts to the direct action of the heat.

From the foregoing it will be seen that the parts are strongly and rigidly secured to the cup 5 so that the entire structure can be easily lifted out of the heating chamber and as easily inserted therein.

In operation:—

The required quantity of water is placed in the fount, which however should not quite reach to the biggin. The circulation or pumping device is now introduced into the fount and its cup 5 inserted in the heating chamber 3 as shown in Fig. 1. The desired quantity of coffee is next placed in the biggin and the covers secured in place. Upon heating of the relatively small amount of water in the chamber 3 steam is rapidly generated, forcing the water in the main tube through the top of the latter and onto the coffee, the water then gravitating back into the body of the fount. After this impulse has been given, the pressure on the ball check valve is released and some of the liquor in the fount is forced through the J-shaped admission tube into the main tube, whereupon the operation is repeated.

The J-shaped or admission tube acts as a siphon, since the velocity of the liquor as it is expelled from the top of the main tube plus the pressure of the liquor in the fount upon the under side of the ball valve, causes liquor in the fount to be siphoned up into the main tube, which would not occur were the main tube to lead straight into the heating chamber.

While the invention is disclosed as used with electrical heating means it is to be expressly understood that this may be eliminated and heat obtained from gas or a coal range or other source.

Having thus described my invention what I claim as new and desire to secure by Letters Patent is:

1. In combination with a container, a heating chamber in the base of the container, a main tube, a cup secured to the lower end of the tube and having a closed top through which the tube projects, a flange on the cup, said heating chamber formed to receive the cup and engage the flange thereof, a J-shaped tube having its shorter leg extending upwardly into the lower end of the main tube and having its longer leg extending through the top of the cup, and a ball valve vertically movable in the main tube and seating on the upper end of the shorter leg of the J-shaped tube.

2. In combination with a container, a heating chamber in the base of the container, a main tube, a cup secured to the lower end of the tube and having a closed top through which the tube projects, a J-shaped tube having its shorter leg extending upwardly into the lower end of the main tube and having its longer leg extending through the top of the cup, and a ball valve vertically movable in the main tube and seating on the upper end of the shorter leg of the J-shaped tube.

3. In combination with a container having a chamber in the base thereof, a closed cup receivable in the chamber, a main tube extending into the cup and secured thereto, a J-shaped tube having one leg entering the main tube and having its other leg extending through the cup, and a valve in the main tube for controlling the J-shaped tube.

In testimony whereof I have signed my name to this specification.

JOSEPH ROI MARCHESSEAULT.